(12) United States Patent
Fujinaga et al.

(10) Patent No.: US 9,591,105 B2
(45) Date of Patent: Mar. 7, 2017

(54) COMMUNICATION APPARATUS, COMMUNICATION SYSTEM, COMMUNICATION METHOD, AND PROGRAM FOR IMPROVED DATA TRANSFER EFFICIENCY

(75) Inventors: Hiroyuki Fujinaga, Kanagawa (JP); Tsutomu Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1226 days.

(21) Appl. No.: 12/360,769

(22) Filed: Jan. 27, 2009

(65) Prior Publication Data

US 2009/0196309 A1 Aug. 6, 2009

(30) Foreign Application Priority Data

Jan. 29, 2008 (JP) ................................ P2008-018121

(51) Int. Cl.
*H04L 29/06* (2006.01)

(52) U.S. Cl.
CPC .................... *H04L 69/18* (2013.01)

(58) Field of Classification Search
CPC ..... H04L 69/18; H04L 69/161; H04L 69/166; H04L 69/22; H04L 69/10; H04L 67/2828; H04W 28/06; H04W 28/065
USPC ....... 370/328, 329, 338, 466, 467, 469, 474, 370/476, 477
See application file for complete search history.

(56) References Cited

U.S. PATENT DOCUMENTS

| | | | |
|---|---|---|---|
| 6,788,675 B1 * | 9/2004 | Yang | 370/352 |
| 7,280,478 B2 * | 10/2007 | Oh | H04Q 11/0066 |
| | | | 370/235 |
| 2001/0007137 A1 * | 7/2001 | Suumaki et al. | 714/18 |
| 2002/0001296 A1 * | 1/2002 | Lee et al. | 370/338 |
| 2002/0001314 A1 * | 1/2002 | Yi et al. | 370/469 |
| 2002/0154627 A1 * | 10/2002 | Abrol | H04L 29/06 |
| | | | 370/352 |
| 2002/0178221 A1 * | 11/2002 | Yaport et al. | 709/204 |
| 2003/0169775 A1 * | 9/2003 | Fan | H04L 63/1458 |
| | | | 370/503 |
| 2004/0059794 A1 * | 3/2004 | Karaoguz | G06F 17/30899 |
| | | | 709/217 |
| 2005/0041643 A1 * | 2/2005 | Noguchi | H04L 29/06027 |
| | | | 370/352 |
| 2006/0002416 A1 * | 1/2006 | Yagihashi | 370/428 |
| 2008/0192925 A1 * | 8/2008 | Sachs et al. | 380/29 |

(Continued)

FOREIGN PATENT DOCUMENTS

| | | |
|---|---|---|
| JP | 6-197143 | 7/1994 |
| JP | 2000-253040 | 9/2000 |
| JP | 2005-191819 | 7/2005 |

*Primary Examiner* — Stephen J Clawson
(74) *Attorney, Agent, or Firm* — CHIP Law Group

(57) ABSTRACT

A communication apparatus includes a physical layer to perform signal transmission/reception with another communication end, and a protocol conversion section (PCL) to connect an upper level user application and the physical layer. The protocol conversion section includes a parameter extraction section to extract a prescribed parameter from communication start request data (CBW) transmitted from the user application, and a header addition section to add a header containing the extracted parameter to transmission data transmitted from the user application, and the physical layer transmits the transmission data with the header.

8 Claims, 19 Drawing Sheets

(56) References Cited

U.S. PATENT DOCUMENTS

2009/0252040 A1* 10/2009 Kocaturk ............ H04L 43/0852
370/241

* cited by examiner

| Service Name | Type | | | | Parameter | Description |
|---|---|---|---|---|---|---|
| | Req | Cnf | Ind | Res | | |
| PCL Common ↔ PCL Emulation | | | | | | |
| START | X | – | – | – | EMU_PARAM | Start Emulation |
| | – | X | – | – | ERROR CODE | |
| END | X | – | – | – | | END Emulation |
| | – | X | – | – | ERROR CODE | |

FIG. 14

| Service Name | Type | | | | Parameter | Description |
|---|---|---|---|---|---|---|
| | Req | Cnf | Ind | Res | | |
| User Application ←→ PCL Emulation | | | | | | |
| Open | x | - | - | - | - | START COMMUNICATION |
| | - | x | - | - | ERROR CODE | |
| Close | x | - | - | - | - | END COMMUNICATION |
| | - | x | - | - | ERROR CODE | |
| Read | x | - | - | - | SEND DATA | RECEIVE DATA |
| | - | x | - | - | ERROR CODE | |
| Write | x | - | - | - | RECV DATA | SEND DATA |
| | - | x | - | - | ERROR CODE | |
| User customize | T.B.D | T.B.D | T.B.D | T.B.D | T.B.D | EXTENDED Service FOR EACH User Protocol |

FIG. 15

COMMUNICATION APPARATUS, COMMUNICATION SYSTEM, COMMUNICATION METHOD, AND PROGRAM FOR IMPROVED DATA TRANSFER EFFICIENCY

CROSS REFERENCES TO RELATED APPLICATIONS

The present invention contains subject matter related to Japanese Patent Application JP 2008-018121 filed in the Japan Patent Office on Jan. 29, 2008, the entire contents of which being incorporated herein by reference.

BACKGROUND OF THE INVENTION

Field of the Invention

The present invention relates to a communication apparatus, a communication system, a communication method and a program.

Description of the Related Art

A mobile communication system intended to transmit information of a mobile unit to a general-purpose portable terminal owned by a user of the mobile unit is hitherto known as described in Japanese Unexamined Patent Application Publication No. 2005-191819, for example.

SUMMARY OF THE INVENTION

Recently, a variety of upper level applications are assumed to be mounted on a communication apparatus, and it is thus necessary for the communication apparatus to be compatible with various kinds of upper level applications. However, in the case of assuming to ensure compatibility between a physical layer of the communication apparatus and various kinds of upper level applications, it becomes necessary to pass the data of the physical layer assumed by the upper level application to another kind of physical layer having a different transfer size or the like which is included in the communication apparatus. Therefore, the necessity to perform processing such as data combining or dividing occurs, which increases the load of the apparatus.

Further, it is necessary for an apparatus that receives the data to analyze all the received data so as to analyze a data type, a write location on memory and so on in order to pass the data to an upper level application.

Upon packet transfer in the case where the upper level application is USB, for example, communication is performed between a USB host and a USB target through a USB physical layer as shown in FIG. 18. In this case, the process flows like this: transmission of a communication request (CBW) from the USB host to the USB target, transfer of data (DATA), and transmission of a completion notification (CSW) from the USB target to the USB host. The direction of data transfer changes depending on the contents of the CBW. Specifically, as shown in FIG. 18, when the USB host performs read operation, data is transmitted from the USB target to the USB host, and when the USB host performs write operation, data is transmitted from the USB host to the USB target. The CBW and the CSW have a data amount of about several tens of bytes. On the other hand, the USB physical layer transmits data after dividing it if the data exceeds 512 bytes. The number of times to transmit 512-byte data is described in CBW data.

In the case of FIG. 18, when a physical layer compatible with a plurality of applications is placed instead of the USB physical layer, it becomes necessary to pass the data of the upper level application (USB physical layer) to another physical layer having a different transfer size. Therefore, the data of the upper level application (USB physical layer) is combined or divided according to the transfer size of the compatible physical layer. This increases processing load and also increases data transfer other than substantial data, thereby degrading the transfer efficiency. Further, it is necessary for a receiving apparatus to recombine data in order to pass the received data to an upper level application, which increases load.

In light of the foregoing, it is desirable to provide a novel and improved communication apparatus, communication system, communication method and program capable of ensuring communication compatibility with an upper level application, improving data transfer efficiency and minimizing processing load.

According to an embodiment of the present invention, there is provided a communication apparatus including a physical layer to perform signal transmission/reception with another communication end, and a protocol conversion section to connect an upper level application and the physical layer, wherein the protocol conversion section includes a parameter extraction section to extract a prescribed parameter from communication start request data transmitted from the upper level application, and a header addition section to add a header containing the parameter to transmission data transmitted from the upper level application, and the physical layer transmits the transmission data to which the header is added.

In the above configuration, signal transmission/reception with another communication end is performed by the physical layer, and a connection between an upper level application and the physical layer is performed by the protocol conversion section. The parameter extraction section extracts a prescribed parameter from communication start request data transmitted from the upper level application, and the header addition section adds a header containing the extracted parameter to transmission data transmitted from the upper level application. Then, the physical layer transmits the transmission data to which the header is added. Thus, by extracting the minimum necessary parameter from the communication start request data and adding it as a header, it is possible to increase the transfer speed and significantly reduce the load for parameter analysis in an apparatus that receives the data.

Further, the protocol conversion section may include a data division section to divide the transmission data into data pieces having a prescribed data amount each, and the header addition section may add one header to a plurality of transmission data pieces obtained as a result of division by the data division section. In this configuration, by bringing small pieces of header information together upon data transmission that occupies a large part of communication, it is possible to increase the transfer efficiency.

Furthermore, the protocol conversion section may include a parameter acquisition section to acquire the parameter from received data received from the other communication end through the physical layer. In this configuration, by acquiring the parameter from the received data, it is possible to acquire various kinds of information related to the received data based on the parameter.

The communication apparatus may further include a data writing section to write the received data to a prescribed location of a storage area based on the parameter. In this configuration by acquiring the recording location of the received data from the parameter, it is possible to write the received data into the prescribed location without analyzing all the received data.

The parameter may contain end point information indicating a data transmission direction and size information indicating a data size. In this configuration, it is possible to acquire the data transfer direction or the size information based on the parameter.

According to another embodiment of the present invention, there is provided a communication system including communication apparatus performing communication with each other, the communication apparatus including a physical layer to perform signal transmission/reception with another communication apparatus as another communication end, and a protocol conversion section to connect an upper level application and the physical layer, wherein the protocol conversion section includes a parameter extraction section to extract a prescribed parameter from communication start request data transmitted from the upper level application, and a header addition section to add a header containing the parameter to transmission data transmitted from the upper level application, and the transmission data to which the header is added is transmitted/received through the physical layer.

In the above configuration, in the communication system where communication apparatus perform communication with each other, signal transmission/reception with another communication end is performed by the physical layer, and a connection between an upper level application and the physical layer is performed by the protocol conversion section in the communication apparatus. The parameter extraction section extracts a prescribed parameter from communication start request data transmitted from the upper level application, and the header addition section adds a header containing the extracted parameter to transmission data transmitted from the upper level application. Then, the physical layer transmits the transmission data to which the header is added. Thus, by extracting the minimum necessary parameter from the communication start request data and adding it as a header, it is possible to increase the transfer speed and significantly reduce the load for parameter analysis in an apparatus that receives the data.

According to another embodiment of the present invention, there is provided a communication method in a communication apparatus including a physical layer to perform signal transmission/reception with another communication end and a protocol conversion section to connect an upper level application and the physical layer, the method including the steps of extracting a prescribed parameter from communication start request data transmitted from the upper level application, adding a header containing the parameter to transmission data transmitted from the upper level application, and transmitting the transmission data to which the header is added through the physical layer.

In the above configuration, in the communication method in the communication apparatus including the physical layer to perform signal transmission/reception with another communication end and the protocol conversion section to connect the upper level application and the physical layer, a prescribed parameter is extracted from the communication start request data transmitted from the upper level application, the header containing the extracted parameter is added to the transmission data transmitted from the upper level application, and the transmission data to which the header is added is transmitted through the physical layer. Thus, by extracting the minimum necessary parameter from the communication start request data and adding it as a header, it is possible to increase the transfer speed and significantly reduce the load for parameter analysis in an apparatus that receives the data.

According to another embodiment of the present invention, there is provided a program in a communication apparatus including a physical layer to perform signal transmission/reception with another communication end and a protocol conversion section to connect an upper level application and the physical layer, the program causing a computer to function as a means to extract a prescribed parameter from communication start request data transmitted from the upper level application, a means to add a header containing the parameter to transmission data transmitted from the upper level application, and a means to transmit the transmission data to which the header is added through the physical layer.

In the above configuration, in the program in the communication apparatus including the physical layer to perform signal transmission/reception with another communication end and the protocol conversion section to connect an upper level application and the physical layer, a prescribed parameter is extracted from the communication start request data transmitted from the upper level application, the header containing the extracted parameter is added to the transmission data transmitted from the upper level application, and the transmission data to which the header is added is transmitted through the physical layer. Thus, by extracting the minimum necessary parameter from the communication start request data and adding it as a header, it is possible to increase the transfer speed and significantly reduce the load for parameter analysis in an apparatus that receives the data.

According to the embodiments of the present invention described above, it is possible to ensure communication compatibility with an upper level application, improve data transfer efficiency and minimize processing load.

BRIEF DESCRIPTION OF THE DRAWINGS

FIG. 14 is a schematic diagram showing services of PCL emulation.

FIG. 15 is a schematic diagram showing services of PCL emulation.

DETAILED DESCRIPTION OF THE PREFERRED EMBODIMENTS

Figure 1:
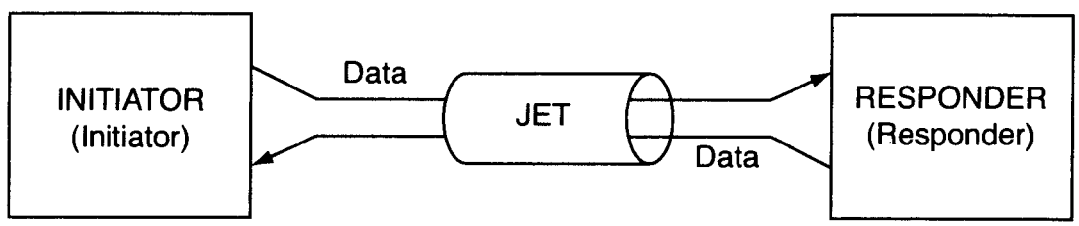
FIG. 1 is a schematic diagram showing two devices constituting a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A wireless communication system according to an embodiment employs a communication scheme designed to transmit and receive data between a pair of devices, and it performs wireless data transmission/reception between the devices in the near field. FIG. 1 is a schematic diagram showing two devices (communication apparatus) that constitute the wireless communication system according to the embodiment. The two devices serve as a responder and an initiator, respectively. The initiator is "the end of making a connection request", and the responder is "the end of receiving the connection request", and one-to-one or peer-to-peer (P2P) communication is performed in this embodiment. Although the initiator makes a connection request and the responder enters a wait state at the time of connection, they play different roles at the time of connection only, and the two devices have the same configuration related to connection. The initiator may be a personal computer, a portable device, an electronic card or the like, and the responder may be also a personal computer, a portable device, an electronic card or the like.

FIG. 1 schematically shows the way that wireless communication is performed through physical layers included in the respective devices according to the embodiment. Although a physical layer called JET is used as an example in this embodiment, the physical layer is not limited thereto, and a general-purpose physical layer for communication may be used. The JET physical layer is particularly suitable for bulk data communication such as photographs and motion videos by use of a profile ID, CSDU and so on, which are described later. In the following description, the initiator and the responder may be referred to collectively as the JET device (or simply as JET).

Figure 2:
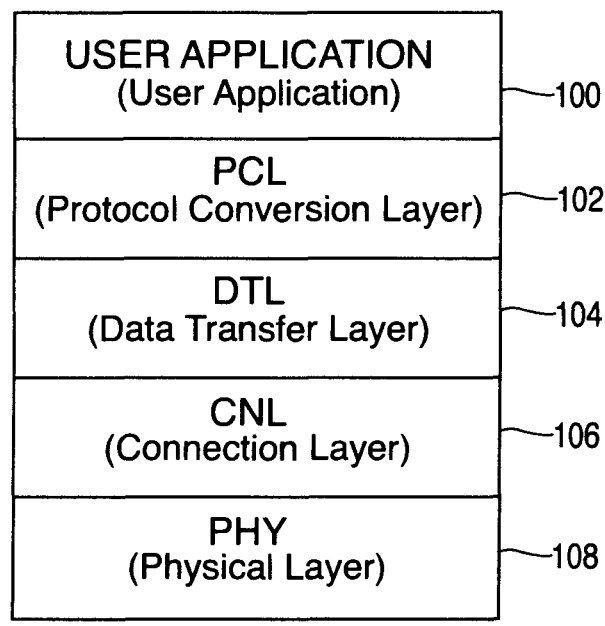
FIG. 2 is a schematic diagram showing the structure of each of the initiator and the responder as a hierarchical structure.

FIG. 2 is a schematic diagram showing the structure of each of the initiator and the responder as a hierarchical structure in the wireless communication system according to the embodiment. Referring to FIG. 2, a user application 100, a protocol conversion layer (PCL) 102, a data transfer layer (DTL) 104, connection layer (CNL) 106, and a physical layer 108 are formed sequentially from the upper level layer in this embodiment.

The user application 100 corresponds to an upper layer protocol (e.g. USB, TCP/IP, OBEX etc.) for performing data communication using services provided by software in upper level layers of the physical layer 108 in the device including the physical layer 108 and capable of the near-field wireless communication according to the embodiment, or an application (e.g. OS such as Windows (registered trademark) and Linux) that performs device control including JET such as a user interface (UI). In the JET device, such an upper layer protocol or a user application is not particularly specified, and it may be set freely by a user (maker) that configures the device. Thus, each device may include a plurality of upper layer protocols or user applications 100.

The PCL 102 (protocol conversion section) supports a protocol conversion function that converts an arbitrary protocol (USB, TCP/IP, OBEX etc.) that is used by a user who configures the device into a unique JET protocol. A plurality of kinds of protocols are thus passed to the physical layer (PHY) 108 of JET, thereby supporting a variety of protocols. Even for the same USB, protocol conversion may be different depending on a difference in OS such as Windows and Linux. The PCL 102 performs processing to convert contents data such as audio and video generated by the upper level user application 100 and other protocol data and command into a data format that can be handled by the lower level DTL 104. Further, the PCL 102 performs processing that is necessary for JET communication, such as connection, disconnection, device authentication, operation mode setting and initialization.

Figure 3:
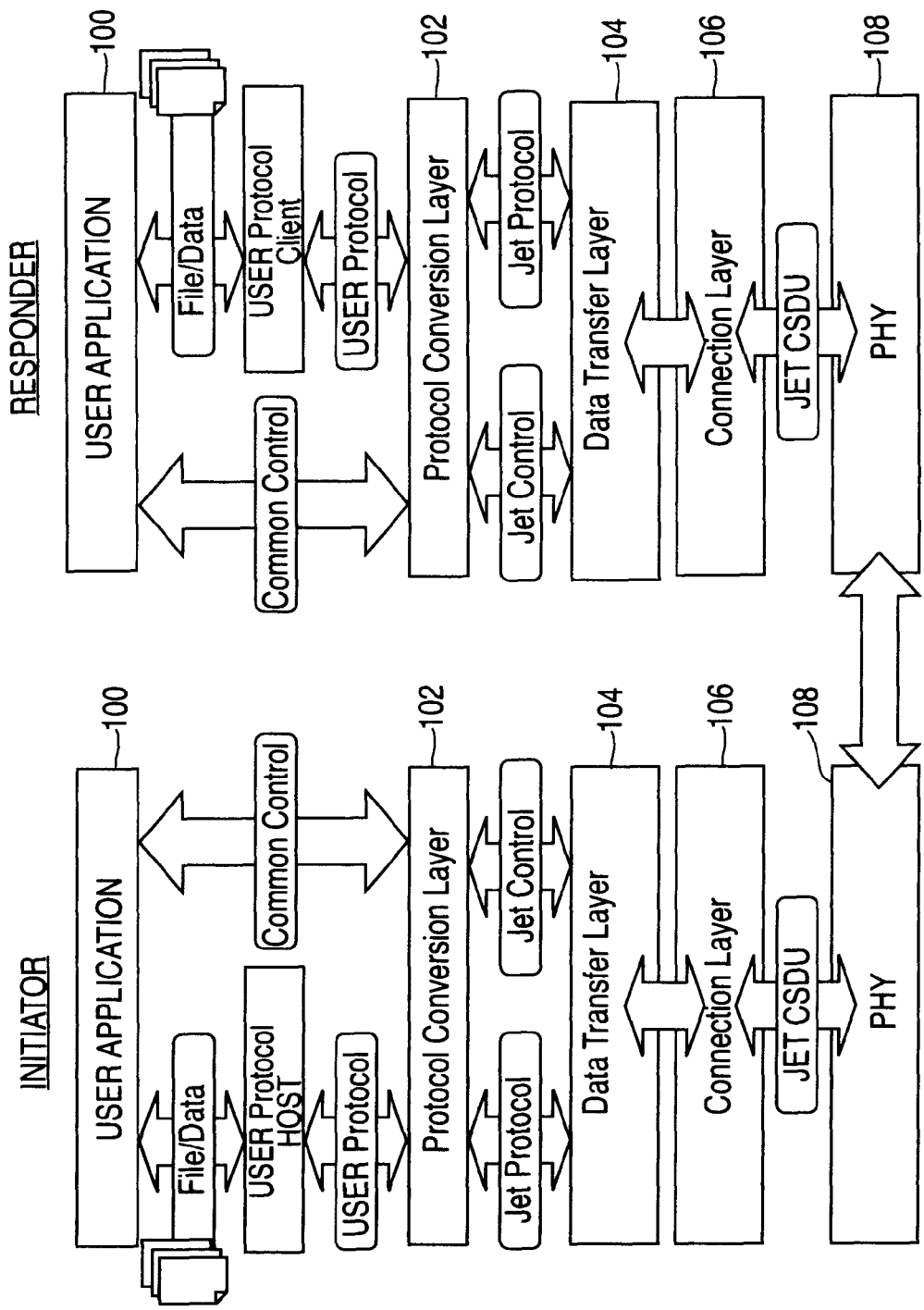
FIG. 3 is a schematic diagram showing data flow in the initiator and the responder.

FIG. 3 is a schematic diagram showing data flow in the initiator and the responder. Referring to FIG. 3, the user application 100 performs two kinds of control: connection by JET and data transfer. In JET, the uppermost level PCL 102 provides a service necessary for implementing those functions and performs conversion into a unique JET protocol and connection control. Further, data is passed to the DTL 104 and the CNL 106 that generate a CNL service data unit (CSDU) in conformity to JET standards.

The DTL 104 shapes the data received from the upper level PCL 102 into a prescribed packet structure and performs transmission between the initiator and the responder using a service provided by the lower level CNL 106. In data reception, the DTL 104 analyzes the data received by the CNL 106, extracts CSDU, and passes its payload to the upper level PCL 102. The CSDU contains status information that can be used in the user application 100 other than communication by the physical layer (PHY) 108, and the DTL 104 performs generation and error notification of such data as well.

The DTL 104 can shape the data input from the upper level into a DTL packet regardless of the type of the upper layer protocol and pass it to the lower level CNL 106, and extract a DTL packet from the received data from the lower level and passes the payload of the DTL packet to the upper level. However, although the DTL 104 can receive data transmitted from a different protocol from the PCL 102, it is necessary in JET to disconnect a session once for data transmission/reception of a different protocol, and therefore the use of a DTL service in a plurality of protocols is not performed.

Because of such a limitation, even if data is input from a plurality of PCL emulations to the DTL 104, the DTL 104 does not perform data Mux. Further, even if received data from the CNL 106 contains a plurality of protocols, the DTL 104 does not perform processing such as analysis of the respective protocols, delivery to the PCL 102 according to the contents of the respective protocols and disconnection of a session by error detection.

Therefore, it is necessary for the PCL 102 that uses the service by the DTL 104 to use the service by the DTL 104 in the state that a protocol to be used is fixed to one kind. A PCL common, which is described later, makes determination for fixing a protocol type and performs necessary transmission/reception, and a PCL emulation performs generation and parsing of protocol data. The PCL common also performs exclusive processing for inhibiting the simultaneous use of a DTL service from a plurality of protocols.

The DTL 104 provides a service necessary for the PCL common to establish a connection and a service necessary for the PCL emulation to transmit/receive data after the connection is established.

Figure 6:
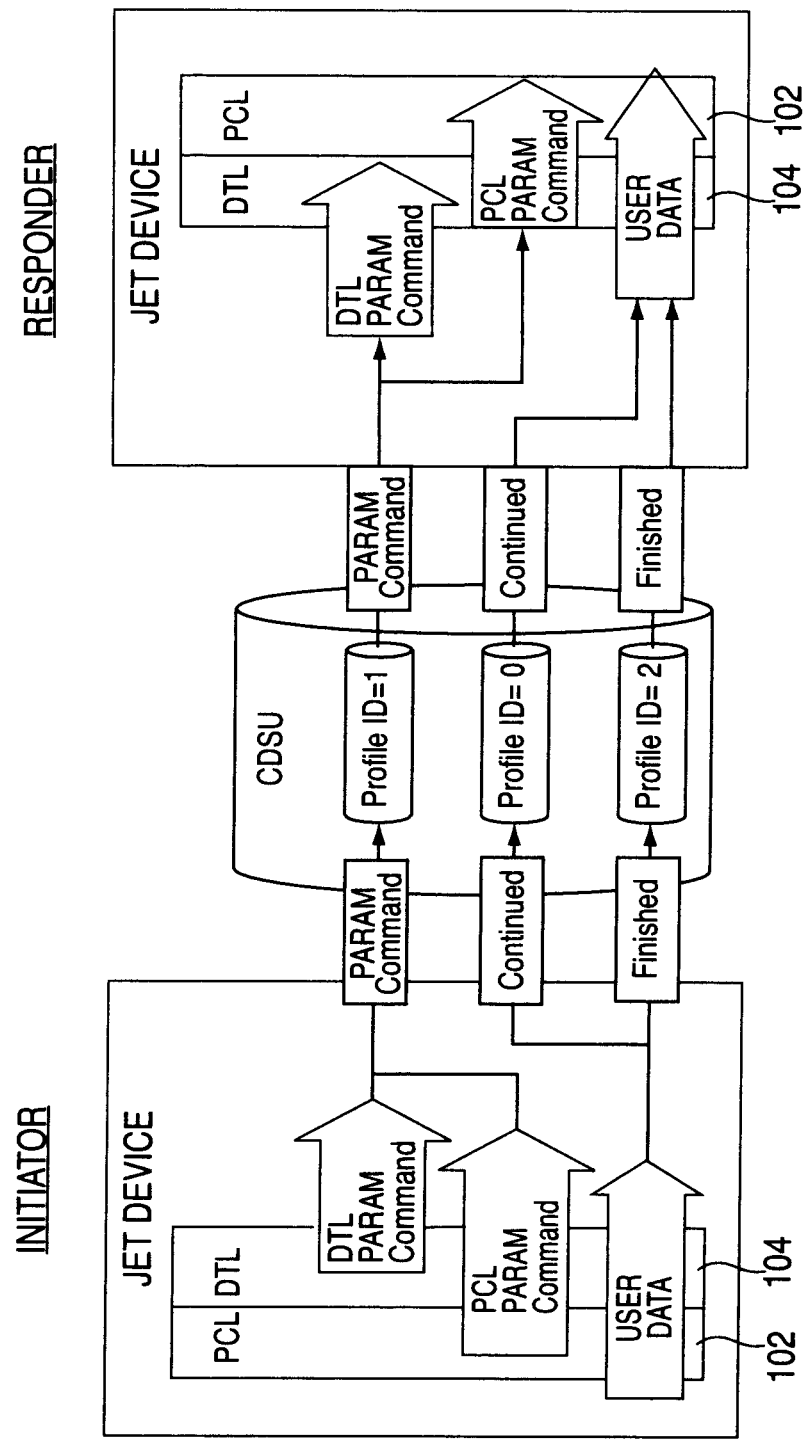
FIG. 6 is a schematic diagram showing a logical channel by CSDU.

Further, the DTL 104 receives a profile ID, which indicates whether the currently executed service is halfway data or last data of an entire transfer size or whether it is a parameter rather than data, and a size as a parameter from the PCL 102 and inserts it into a CSDU packet header that is generated using a lower level CNL service. The DTL 104 embeds a transmission parameter in a part of a CSDU packet that is generated when transmitting data by JET, thereby implementing a plurality of logical channels as shown in FIG. 6 in one physical layer (PHY) 108.

The DTL 104 has a function to generate a CSDU packet specified in the JET standards. The DTL 104 adds a parameter indicating the type of a CSDU packet to a CSDU packet header. A parameter to be added includes a profile ID, a size and a data payload.

The DTL 104 performs data transfer in units of CSDU provided by the CNL 106. The DTL 104 adds the following three kinds of profile IDs (T_DATA, LT_DATA, CNL_DATA) to CSDU when transmitting CSDU. When receiving CSDU, the DTL 104 performs processing according to the kind of the profile ID.

T_DATA, LT_DATA

The DTL 104 adds T_DATA to the CSDU that transfers user data. However, if it is the last CSDU in the division to a CSDU payload, the DTL 104 adds LT_DATA. Only user data is stored in the CSDU payload, and the DTL 104 does not embed header information or the like.

CNL_DATA

The DTL 104 adds CNL_DATA to the CSDU that transfers control data specific to a JET system. An example of control data is parameter information or the like. Header information (specifically, TBD) is embedded in the CSDU payload. The DTL 104 interprets the header information and performs appropriate processing.

The CNL 106 performs communication using the service of the physical layer 108 in response to a request from the upper level DTL 104 and further performs establishment or disconnection of a connection of the physical layer 108, ensuring data continuity and so on.

The physical layer 108 is a JET physical layer of the wireless communication system capable of near-field bulk communication according to the embodiment, and it has an error correcting function and a preamble sense function.

Figure 4:
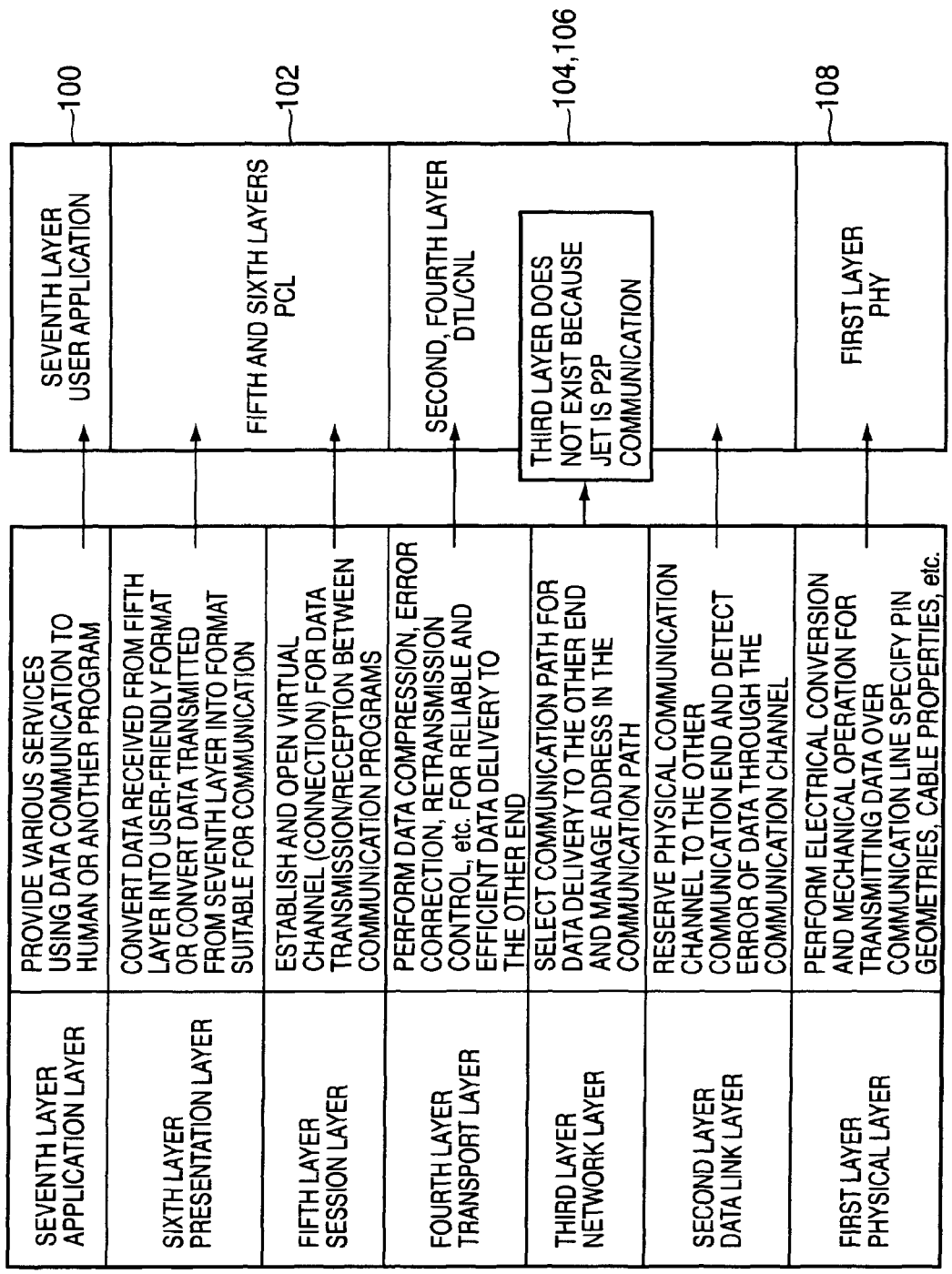
FIG. 4 is a schematic diagram showing the structure of FIG. 2 as the OSI reference model.

FIG. 4 shows the structure of FIG. 2 as the OSI reference model based on the role of software of the device on which the JET device is mounted. Referring to FIG. 4, the physical layer (first layer) 108 performs electrical conversion and mechanical operation for transmitting data over a communication line. Further, pin geometries and cable characteristics and so on are specified in the first layer.

The DTL 104 and the CNL 106 correspond to a data link layer (second layer) and a transport layer (fourth layer). The data link layer reserves a physical communication channel with the other communication end and detects an error of data flowing through the communication channel. The transport layer performs data compression, error correction, retransmission control and so on for reliably and efficiently delivering data to the other end. Because the system of this embodiment is P2P communication, a network layer (third layer) in the OSI reference model is not placed, thereby simplifying the system.

The PCL 102 corresponds to a session layer (fifth layer) and a presentation layer (sixth layer). The session layer establishes and opens a virtual channel (connection) for transmitting and receiving data between commutation programs. The presentation layer converts data received from the session layer into a user-friendly format or converts data transmitted from an application layer into a format suitable for communication.

The user application 100 corresponds to an application layer (seventh layer). The application layer provides various services using data communication to human or another program.

Figure 5:
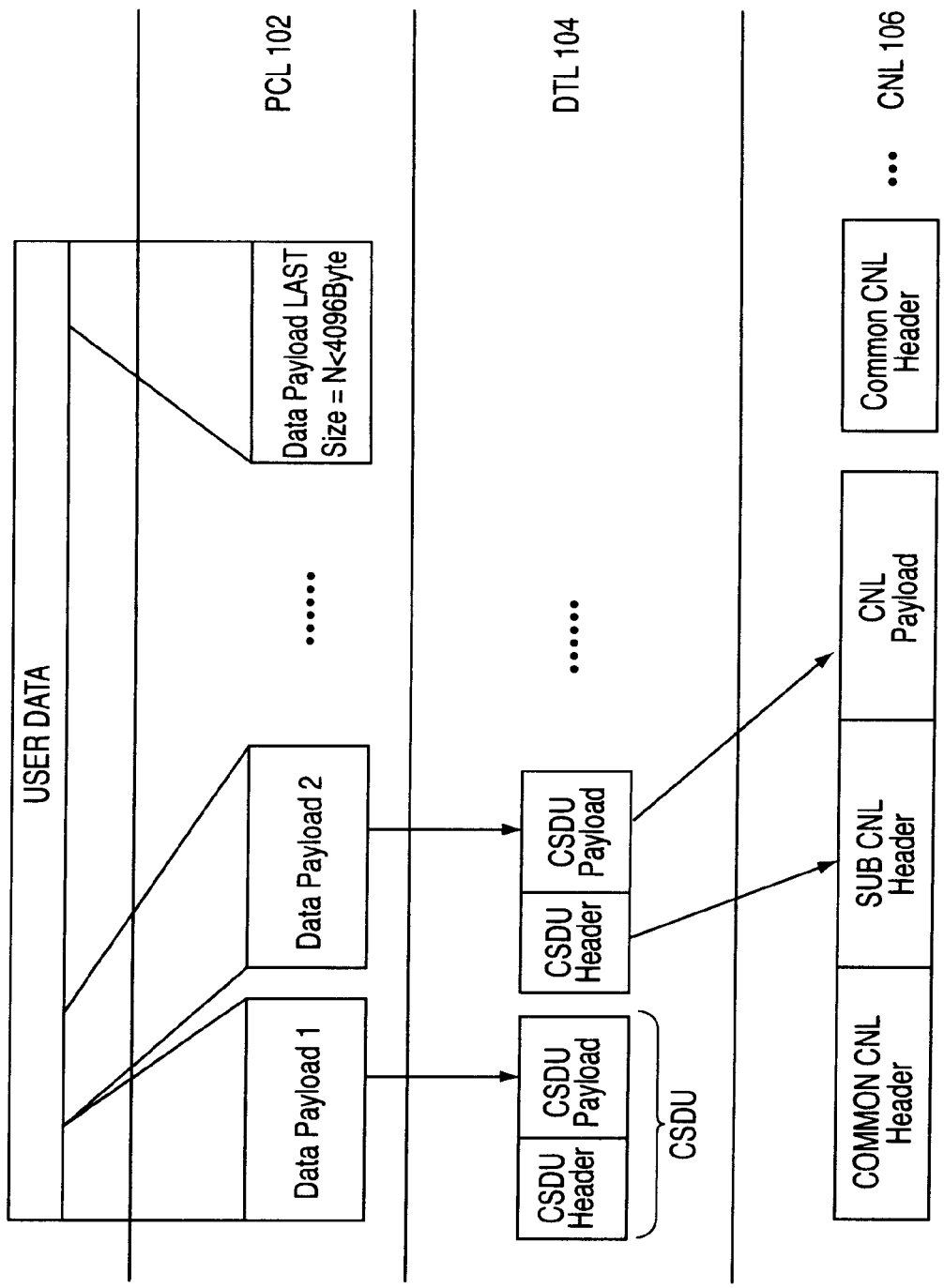
FIG. 5 is a schematic diagram showing data flow of transmission/reception of a file and data in each layer in the device.

Data flow in the communication apparatus according to the embodiment is described hereinafter. FIG. 5 is a schematic diagram showing data flow, and it illustrates data flow of transmission/reception of a file and data in each layer inside the JET device. The PCL 102 has two separate functions: the PCL common and the PCL emulation. The PCL emulation is used for data transfer, and therefore the processing in the PCL 102 shown in FIG. 5 is implemented by the function of the PCL emulation. The CSDU input to the physical layer 108 is specified as a data format, and this is the same for the data format handled by the DTL 104 that generates and analyzes the header information or the like.

Further, as described later, while the PCL common for providing a common function is specified, the PCL emulation depends on system specifications according to each protocol because it performs data conversion based on a user protocol.

In JET communication, transmission/reception of not only data such as a file but also a control parameter in the PCL 102 and the DTL 104 and data with the same layer at the other communication end exist. Such a file and a parameter are finally transmitted in a format in conformity to a CSDU format by the CNL 106. FIG. 6 is a schematic diagram showing a logical channel by CSDU. Referring to FIG. 6, a profile ID is used for identifying the type of data. It is thereby possible to use a plurality of transmission channels logically in the level of the physical layer 108. This significantly improves a communication rate and it is thus suitable for bulk data communication such as motion videos.

Figure 7:
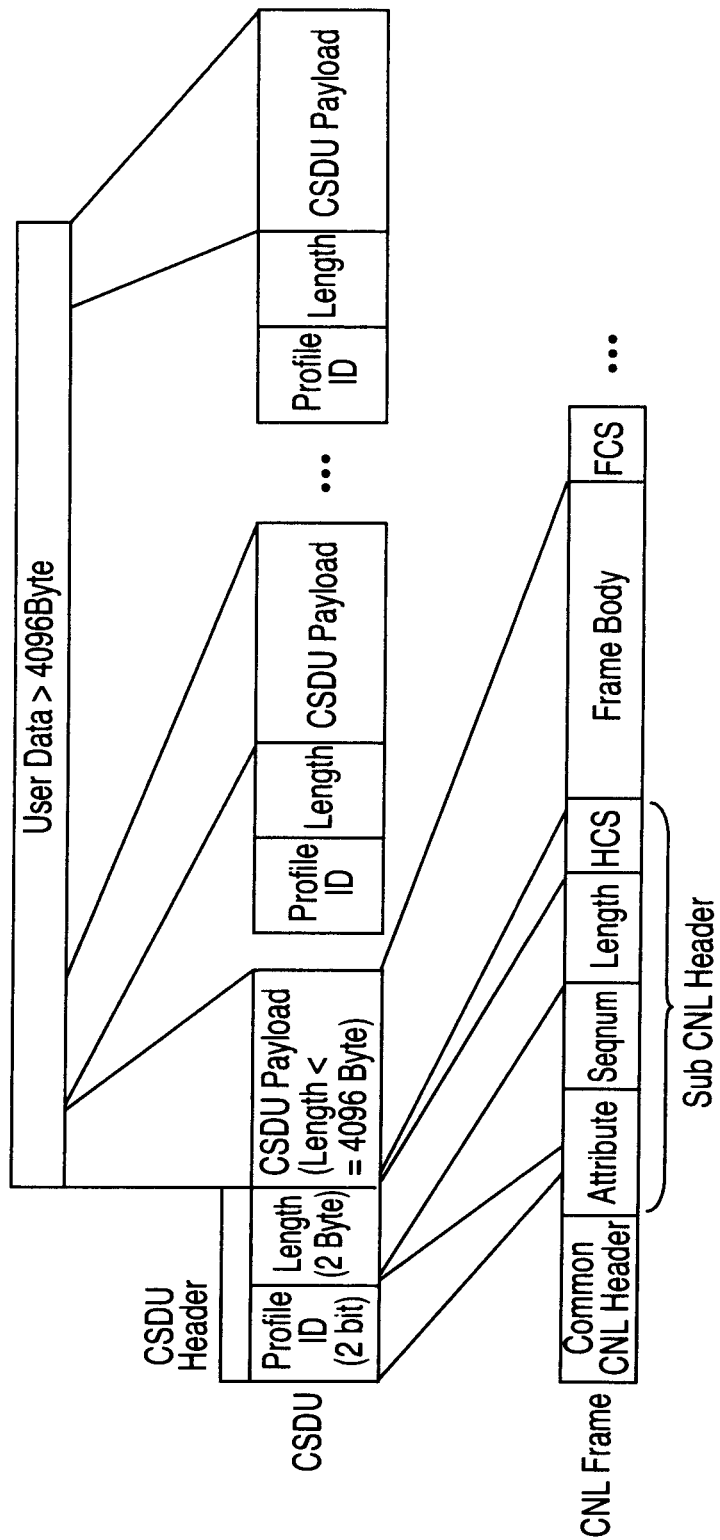
FIG. 7 is a schematic diagram showing the way that CSDU is mapped.

FIG. 7 is a schematic diagram showing the way that CSDU is mapped. The CSDU is a data unit that is exchanged between the CNL 106 and the DTL 104, and it is mapped into a CNL frame as shown in FIG. 7. A user data size transmitted and received by the user application 100 is not particularly specified. If a data length exceeds a data division length (maximum 4096 bytes), the PCL 102 divides the data into a plurality of CSDU payloads. The PCL 102 calls a DTL service in units of CSDU payloads and transmits and receives user data. The DTL 104 adds a header to a CSDU payload and passes it to the lower level CNL 106. The CSDU header is made up of a profile ID and a length indicating the length of the CSDU payload.

Figure 8:
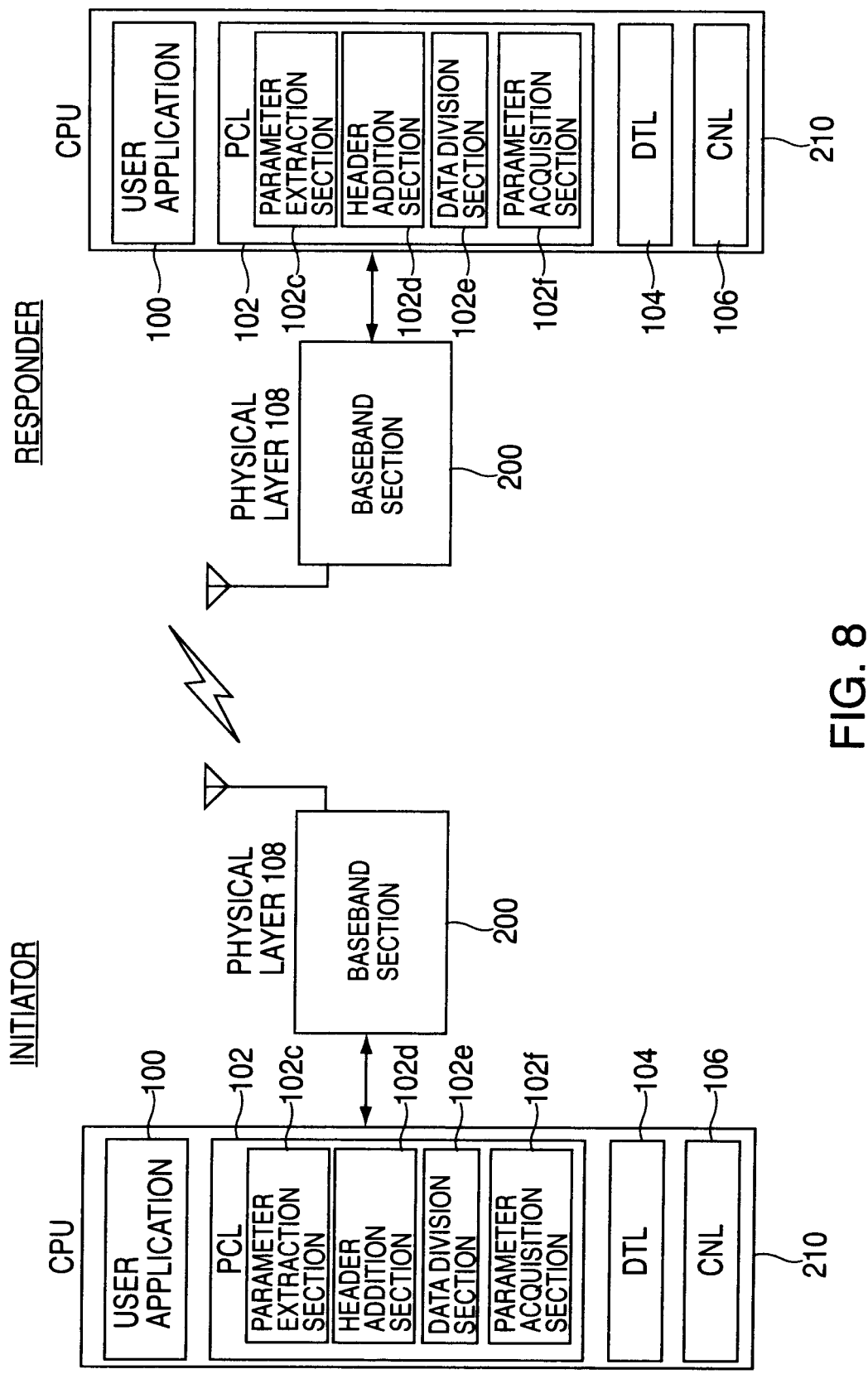
FIG. 8 is a schematic diagram showing the hardware configuration of the devices.

FIG. 8 is a schematic diagram showing the hardware configuration of the devices of the present system. Referring to FIG. 8, each of the initiator and the responder includes a chip 200 forming the physical layer 108 and a CPU 210. The physical layer 108 includes a baseband section. The above-described user application 100, the PCL 102, the DTL 104 and the CNL 106 are implemented by causing the CPU 210 to function using software (program). The software is stored in a memory included in the communication apparatus constituting the initiator and the responder, a recording medium outside the communication apparatus and so on.

Referring to FIG. 8, the PCL 102 includes a parameter extraction section 102c that extracts a prescribed parameter such as end point information and a data size from communication start request data (CBW), a header addition section 102d that adds a header containing the extracted parameter to transmission data, a data division section 102e that divides transmission data into data pieces of 4 Kbytes each, and a parameter acquisition section 102f that acquires a parameter from received data. Those functional blocks are mainly implemented by a PCL emulation 102b, which is described later.

Figure 9:
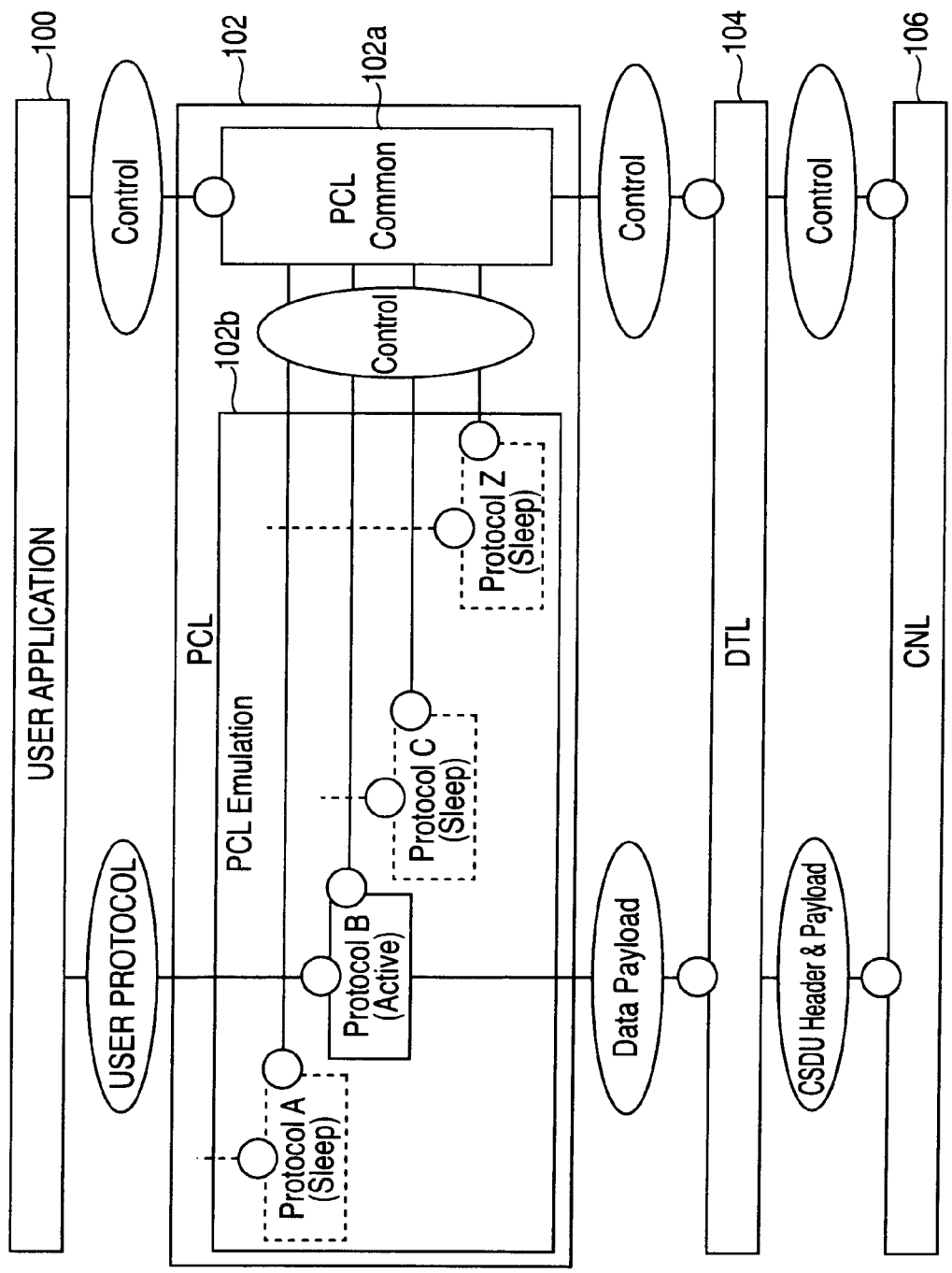
FIG. 9 is a schematic diagram showing access points of services provided by respective layers and a relationship among the layers.

FIG. 9 is a schematic diagram showing access points of services provided by the respective layers and a relationship among the layers. The upper level of the PCL 102 is the user application 100. The PCL 102 is a layer that provides a service using the lower level DTL 104. Because the PCL 102 plays two separate roles with respect to the upper level user application 100: a PCL common 102a (common processing section) for control and a PCL emulation 102b (conversion processing section) for data transfer, the services of the PCL are specified for the respective sections.

The PCL common 102a provides the following services by calling connection/disconnection/other control services of the DTL 104 in response to a request from the user application 100:
 a control service such as connection and disconnection;
 an event notification service such as an error; and
 an emulation control service.

The service by the PCL emulation 102b exists individually for a corresponding protocol. Each PCL emulation is a protocol service that enables communication by superimposing command or data of a general-purpose protocol (USB, TCP/IP, OBEX etc.) on a CSDU payload.

In the PCL 102, only the service corresponding to the protocol type selected by the PCL emulation service is allowed to start. Inside the PCL emulation service, a CSDU payload for using the service by the DTL 104 is generated according to a request from the upper layer protocol. With a plurality of services by the PCL emulation 102b, it is possible to implement a plurality of emulation services in one JET device. The PCL common 102a makes control so that the emulation service that can be used in one-time session is only one kind.

Referring to FIG. 9, the PCL 102 implements two separate functions by the PCL common 102a and the PCL emulation 102b. The PCL common 102a provides basic functions such as initialization of the service of the lower level layer, connection and disconnection according to a request from the upper level user application 100. Because the PCL common 102a performs processing of the basic functions, the same processing is performed regardless of which protocol is selected. On the other hand, the PCL emulation 102b converts an arbitrary protocol held by the user application 100 into a protocol format that is handled by the lower level DTL 104 and the CNL 106 after completing the startup by the PCL common 102a.

As described above, the PCL common 102a provides common function services such as initialization and basic communication (connection, disconnection, device authentication) to the user application 100. The PCL common 102a is software that is installed commonly in all JET devices. Thus, the PCL 102 does not operate in the configuration with the PCL emulation 102b only.

The PCL emulation 102b performs transfer of user data after a connection is established by the PCL common 102a, and it converts a user protocol (general-purpose protocol data such as USB, TCP/IP and OBEX) into a data format to be handled by the DTL 104. Specifically, the PCL emulation 102b converts user protocol data that is transmitted from the user application 100 into a format that can be interpreted by the lower level DTL 104. An emulation block (a conversion module of the PCL emulation 102b) in the PCL 102 provides a service for providing a data transfer function in the same manner as controlling an existing device such as USB, MSC and NFC when viewed from the user application 100. The number of the PCL emulations 102b corresponds to the number of protocols unique to a user who configures the device.

The DTL 104 provides a function using a service of the lower level CNL 106 as a DTL service to the two kinds of the upper level PCL (the PCL common 102a and the PCL emulation 102b). Although the PCL emulation 102b has different conversion modules (protocol A, protocol B, protocol C, . . . and protocol Z) for different user protocols as described in detail layer, only one kind of conversion module can be used in one-time session (connection), and it is controlled by the PCL common 102a. If the upper level protocol is USB, for example, different conversion modules are prepared for mass storage class and other schemes.

In the JET device, a user who configures the device can build the PCL emulation 102b by freely setting a conversion module corresponding to the upper level protocol. Further, a user can freely add or eliminate a conversion module. On the other hand, because the PCL common 102a is the basic function of protocol conversion, it is mandatory that the PCL common 102a is common among all JET devices.

FIG. 9 shows the protocols A to Z as examples of user protocols, and it illustrates the state where the protocol B is active and a connection is established by the protocol B. In such a case, the connection by the protocol B is performed in both of the initiator and the responder. Which protocol is used for establishing a connection is determined by negotiation between the initiator and the responder.

Figure 10:
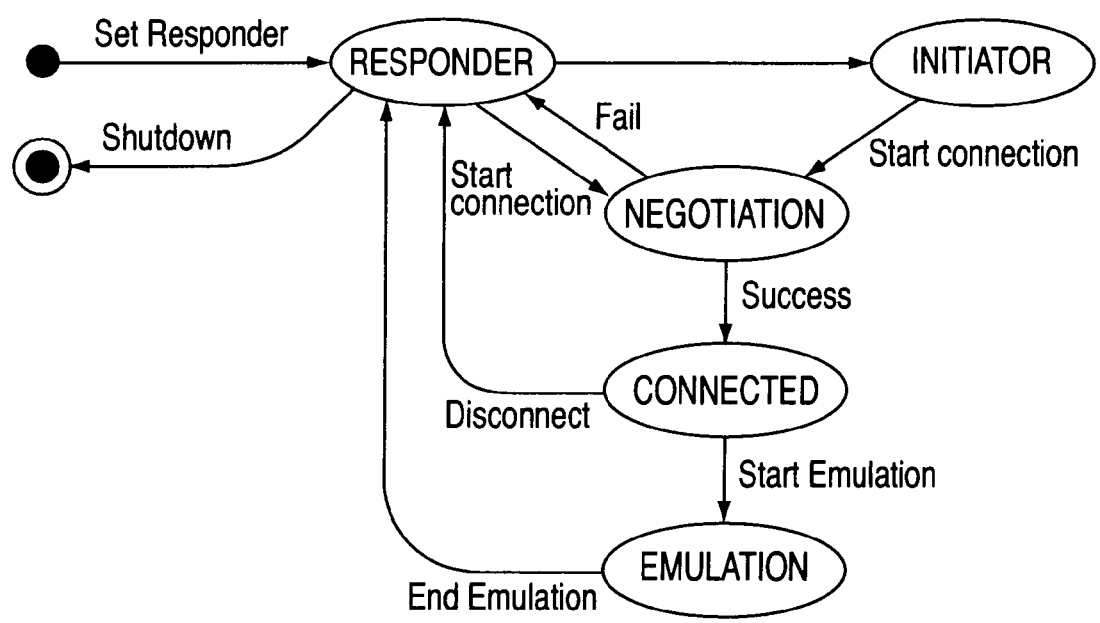
FIG. 10 is a schematic diagram showing state transition in a system of an embodiment.

FIG. 10 is a schematic diagram showing state transition in the system of the embodiment. The PCL 102 makes the state transition as shown in FIG. 10 due to change in the connection state between the initiator and the responder by the physical layer 108 or use of the PCL service from the user application 100.

Referring to FIG. 10, the responder first enters a wait state for a connection from the initiator, and the initiator enters a state to search for the responder to be connected with. If a connection between the initiator and the responder is started ("start connection"), negotiation is performed between the initiator and the responder ("negotiation"). In this state, checking of a software version and an emulation type (what protocols are held in each device) is performed between the JET devices.

As a result of the negotiation, if the version and the emulation type match respectively, a connection is established, and thereby a connection by the physical layer 108 ends ("connected"). After that, emulation is started ("emulation"), and data transfer is enabled between the user applications 100. On the other hand, if the software version information does not match, or if the protocols held in each device does not match and thus the emulation type does not match, a connection is not established ("disconnect"). When a connection is not established ("disconnect") or when the emulation ends ("end emulation"), the responder enters a connection wait state.

The PCL common 102a has a negotiation function that performs version check and emulation type determination based on the version information of the PCL 102. As a result of the negotiation, if the version and the emulation type match, a connection by the same protocol is established between the initiator and the responder. A version management function (PCL version management) and an emulation determination function (PCL select emulation) necessary for the negotiation are described later. The negotiation is not a service that is provided to the user application 100 but an internal function that is automatically executed upon detection of a connection during the connection wait state.

Figure 11:
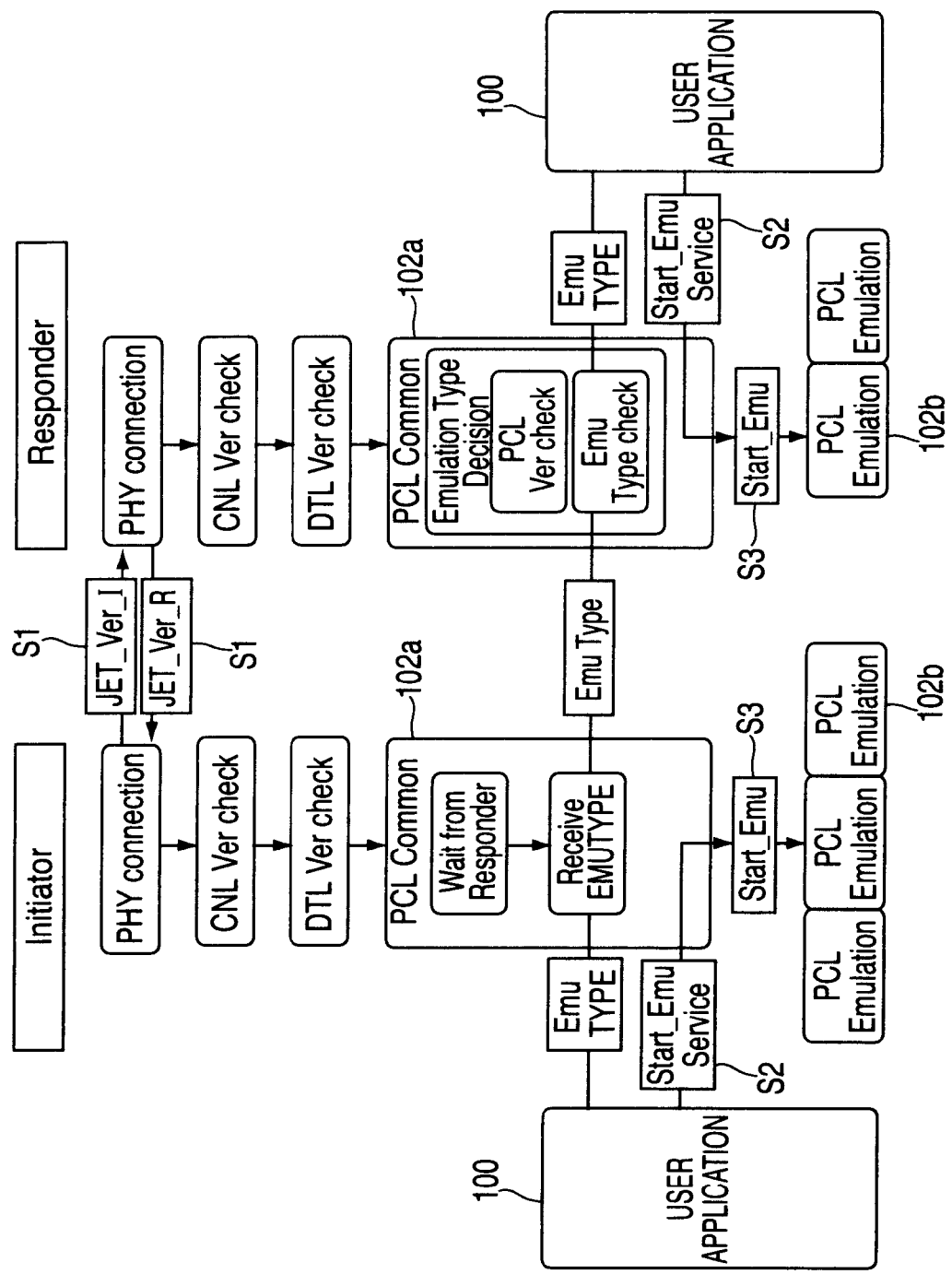
FIG. 11 is a schematic diagram showing negotiation processing.

FIG. 11 is a schematic diagram showing negotiation processing. The processing shown in FIG. 11 can be implemented by causing the CPU 210 to function using the software of each layer in FIG. 2. As an example, the responder performs determination, and the initiator waits for the determination result. The version information of the device to be connected with is acquired by the CNL 106, and the version information is automatically converted at the time of connection (step S1). The version information converted at this time is referred to as the JET version.

In the PCL 102, the JET version information of the JET device to be connected with is already acquired at the time of detecting the connection by the event from the lower level CNL 106 and the DTL 104. Thus, firstly, the software version check of the CNL 106 (CNL Ver check) and the software version check of the DTL 104 (DTL Ver check) are performed as shown in FIG. 11. Further, the emulation type is determined by checking the PCL version contained in the JET version inside the PCL 102.

The determination of the emulation type is performed at the initiative of the responder, for example. The version information of the PCL 102 is exchanged between the initiator and the responder, and the version information of the software of the PCL 102 is checked by the PCL version check function of the PCL common 102a (PCL Ver check).

Then, the emulation type information is exchanged between the initiator and the responder, and the type of the emulation is checked by the emulation type check function of the PCL common 102a as shown in FIG. 11 (EMU Type check). The emulation type is a parameter in which the emulation type (protocol) that can be communicated by the respective JET devices is described.

The responder compares the emulation types of the initiator and the responder and if there is a match, it determines that a connection is possible. Upon determination of the emulation type, the PCL 102 gives notification to the user application 100, and the user application 100 calls PCL_start_emu service (step S2). Then, the PCL common 102a transmits a command Start_Emu to the PCL emulation 102b. The startup by the PCL common 102a thereby ends, and then the emulation by the PCL emulation 102b starts (step S3). The PCL emulation 102b converts the protocol of the user application 100, thereby enabling communication with the lower level DTL 104 and the CNL 106.

In the case where a plurality of the same emulation types are held by the initiator and the responder, the PCL 102 notifies that to the user application 100. If the user application 100 designates one of the plurality of emulation types, such information is transmitted to the PCL 102. At this time, the user application 100 can designate a previously designated one emulation type. Further, in the case where the necessity of using a protocol capable of high-speed communication is relatively low such as when one of the initiator or the responder is a portable device, it is possible to select the emulation type of an appropriate protocol according to a communication speed. Such specifications may be freely set by a user who configures the JET device or the user application 100.

Emulation selection by the PCL 102 is described hereinafter. The emulation selection is a function that is executed inside the PCL common 102a when performing the negotiation in the responder upon connection detection from the initiator. It is checked whether the devices have any matching emulation from the PCL version information in the JET version exchanged between the JET devices at the time of connection.

Figure 12:
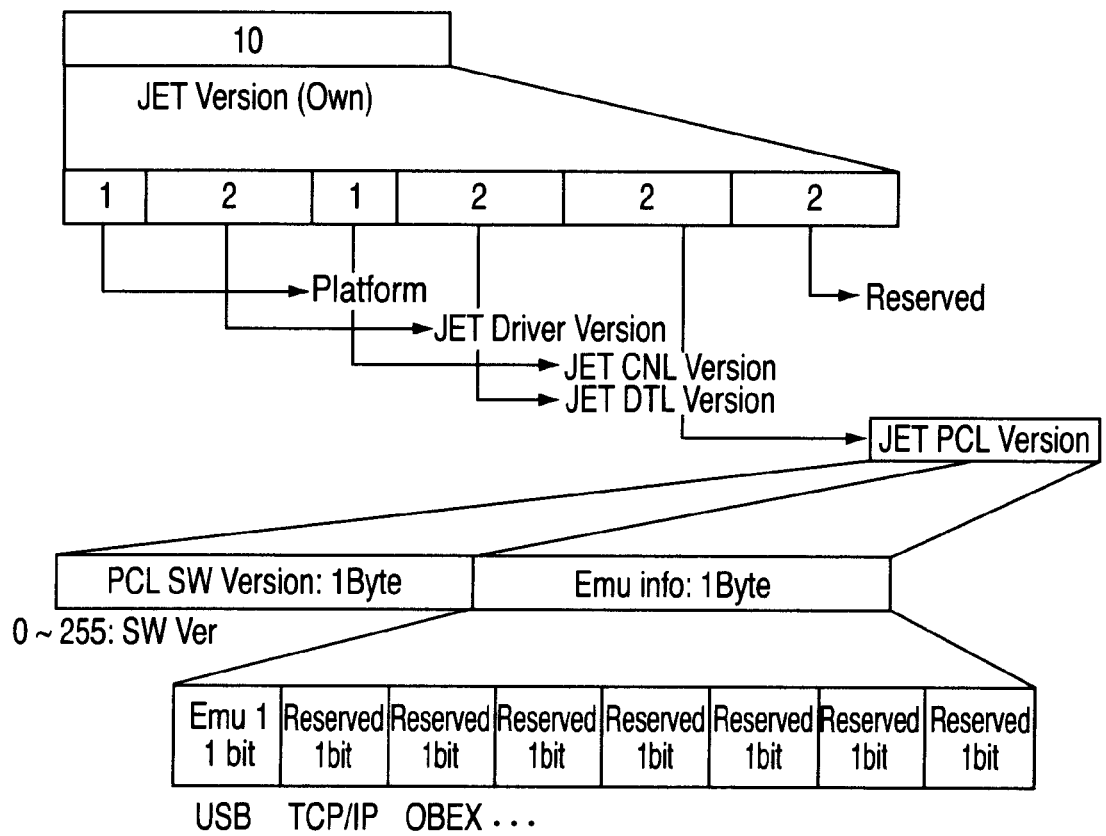
FIG. 12 is a schematic diagram illustrating PCL version information.

FIG. 12 is a schematic diagram illustrating the JET version information. The PCL 102 manages two pieces of version information: the version information of the own device and the version information of the JET device to be connected with. The version information of the own device is loaded upon startup, and it holds the version information of the device to be connected with at the time of connection detection and during connection.

Referring to FIG. 12, the JET version information is 10 bytes in total, and it contains platform information (1 byte), JET driver version information (2 bytes), CNL version information (1 byte), DTL version information (2 bytes), PCL version information (2 bytes) and reserved (2 bytes) sequentially from the upper level layer.

In the PCL version information (2 bytes), 1 byte in the first half indicates the version No (T.B.D.) of software for maintaining the system compatibility, and 1 byte in the latter half indicates the emulation type supported by the device (JET device). In FIG. 12, USB, TCP/IP, OBEX . . . are shown as examples of the emulation type, and 1-bit data is allocated to each type. The bit of 1 represents that the device supports the emulation type, and the bit of 0 represents that the device does not support the emulation type. Although a maximum value of emulation types supported by one JET device is not particularly regulated, it is necessary to support at least one emulation type.

Checking of the version information is performed sequentially from the information in the upper level layer side (the platform side) of FIG. 12 as shown in FIG. 11. After checking the version information in the PCL 102, checking of the emulation type is performed.

Figure 13:
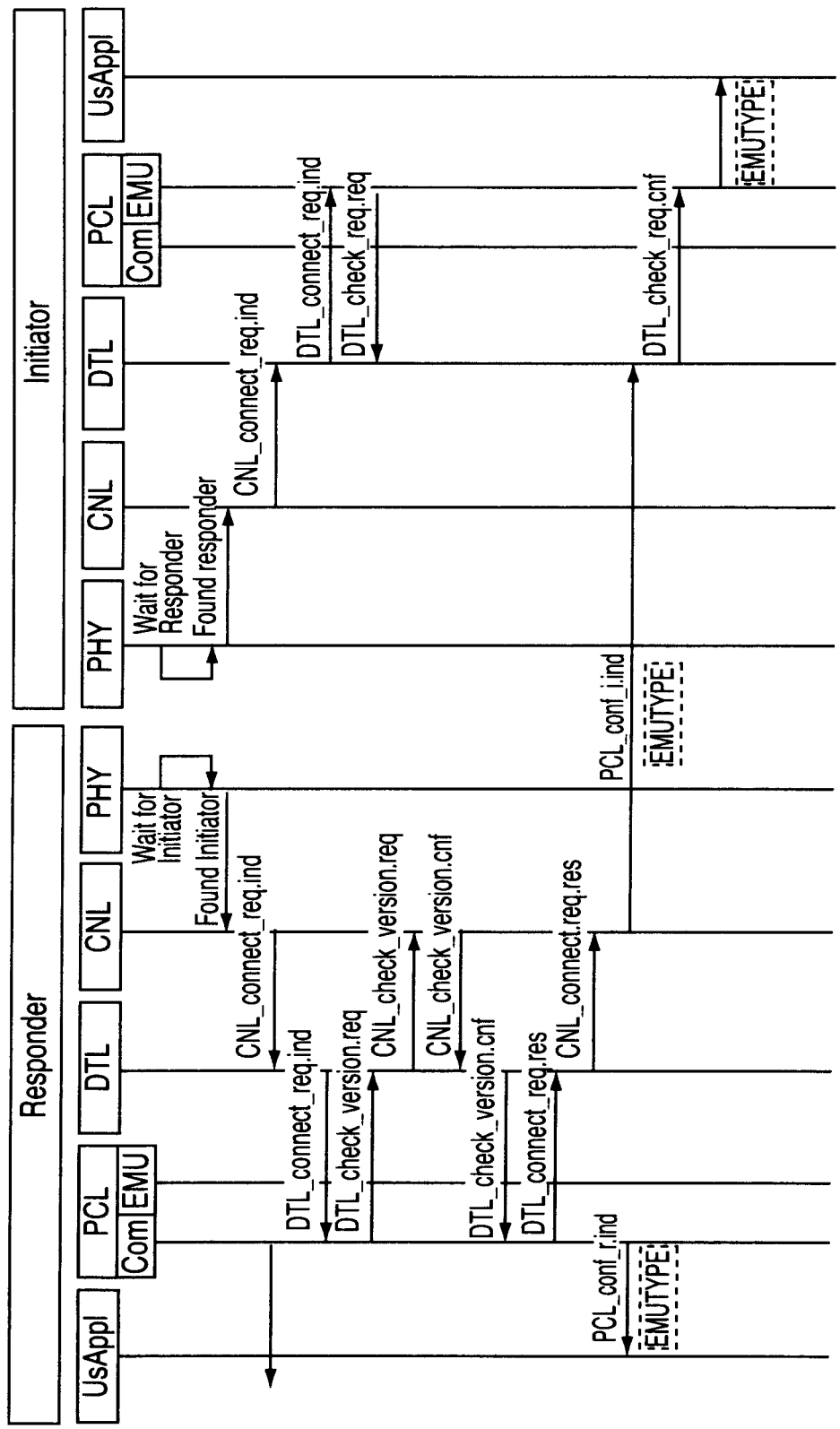
FIG. 13 is a schematic diagram showing a sequence of emulation selection.

As a result of executing a connection, the emulation type that can be communicated between the devices is selected, and the selected emulation type is supplied from the responder to the user application 100, and also supplied to the initiator waiting for permission. FIG. 13 is a schematic diagram showing the sequence of the emulation selection. Referring to FIG. 13, the selected emulation type (EMU-TYPE) is supplied as PCL_conf_r.ind to the user application 100 (UsrAppl) of the responder and supplied as PCL_cnf_i.ind to the initiator.

FIGS. 14 and 15 are schematic diagrams showing services related to the PCL emulation 102b. Each service is described hereinafter. Although start and end are performed by the PCL common 102a, data transmission and reception are executed by performing communication from the user application 100 to the PCL emulation 102b. Thus, the service related to the PCL emulation 102b is divided into a service provided with the PCL common 102a (FIG. 14) and a service provided with the user application 100 (FIG. 15).

Start Service (Mandatory; FIG. 14)

Start service is a service provided as standard, and it provides initialization processing of the PCL emulation 102b that is executed by the PCL common 102a at the time of starting the emulation. Upon completion of Start, data transmission/reception using a user protocol from the user application 100 is enabled.

End Service (Mandatory; FIG. 14)

End service is a service provided as standard, and it provides end processing of the emulation that is executed by the PCL common 102a at the time of ending the emulation. Upon completion of End, data transmission/reception using a user protocol from the user application 100 is disabled. If the emulation is started, the PCL common 102a executes this service before executing disconnection (PCL_Disconnect).

Open Service (Mandatory; FIG. 15)

Open service is a service that provides necessary processing at the time of opening a communication channel on a user protocol.

Close Service (Mandatory; FIG. 15)

Close service is a service that provides necessary processing at the time of closing a communication channel on a user protocol.

Read Service (Mandatory; FIG. 15)

Read service is a service that provides necessary processing at the time of acquiring data of the device to be connected with on a user protocol.

Write Service (Mandatory; FIG. 15)

Write service is a service that provides necessary processing at the time of transmitting data to the device to be connected with on a user protocol.

As described above, Open service and Closer service are the processing corresponding to the initialization of the upper layer protocol by the PCL common 102a. Further, Read service and Write service are the processing related to data transmission and reception by the user application 100.

User Customize Service (Option; FIG. 15)

This is a service that does not correspond to any of the above services, and it can be defined as a unique service by a user who configures the device. The part other than "Open" and "Close" a communication channel and "transmit (Write)" and "receive (Read)" data is a customizable area that can be freely set by a user who configures the JET device, and a user can freely sets it according to the kind (Windows, Linux etc.) of the user application 100, for example. In the use of any application, however, "Start" and "End" by the PCL common 102a are necessary as described above, and they are thus common among all JET devices.

As described in the foregoing, according to the embodiment, the PCL 102 that converts the protocol of the user application 100 is placed, and the PCL common 102a that is commonly placed in each communication apparatus selects the protocol that matches the protocol of the other communication end from one or a plurality of protocols of the user application 100. The selected protocol is converted into a protocol for performing communication in the physical layer 108, thereby enabling selection of the protocol that is most suitable for communication according to the protocol of the user application 100 of the other communication end, which ensures communication compatibility.

Figure 16:
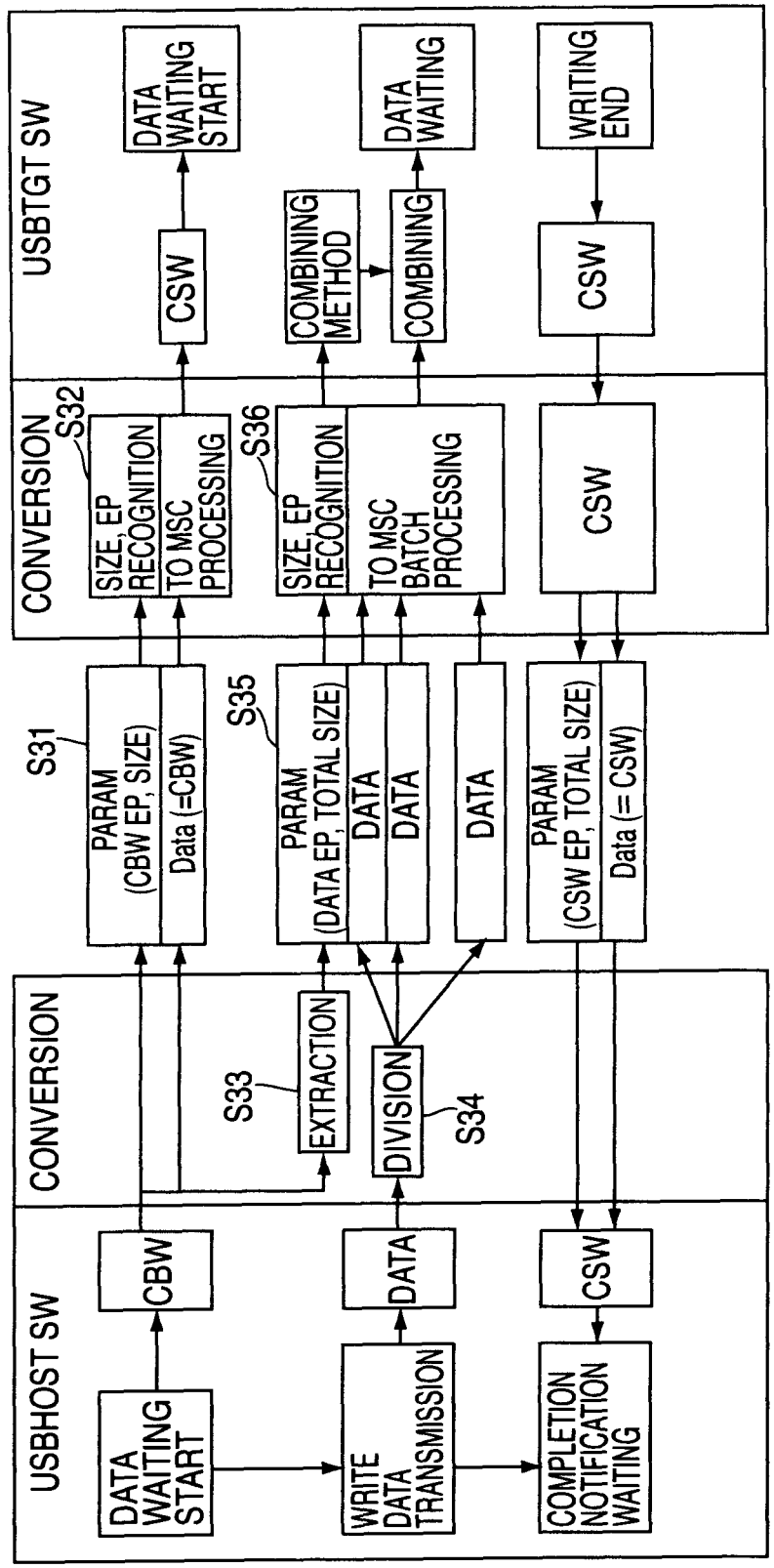
FIG. 16 is a schematic diagram showing processing of extracting necessary data previously in PCL of the initiator on a USB mass storage class protocol to implement efficient data transfer.

Processing of extracting necessary data in advance in the PCL 102 (mainly, the PCL emulation 102b) of the initiator on a USB mass storage class protocol to implement efficient data transfer in the case where an upper level application is USB is described hereinafter with reference to FIG. 16. FIG. 16 shows processing after the negotiation is performed, and the processing of "conversion" shown therein is performed mainly in the PCL emulation 102b. FIG. 16 shows a technique of converting a data format of a USB mass storage, in contrast to a data format handled by a physical layer different from USB, which is the physical layer 108 of the communication apparatus according to the embodiment, into a communication scheme of the JET device according to the embodiment.

In FIG. 16, a header and data are transmitted in separate packets, and they are not transmitted in the same packet. Data transferred in USB is managed in units of URB. This is a unit for managing data in each of a transmitting end and a receiving end, and there is no compatibility in a set value or the like of the URB. Although the URB changes according to a data size managed in the host, equal size information is described in the CBW. Further, an end point number related to a command and data direction is also described in the CBW.

Referring to FIG. 16, the USB host (USBHOST) indicates the upper level application of the initiator. The USB target (USBTGT) indicates the upper level application of the responder.

FIG. 16 shows the case where the initiator transmits data to the responder to write the data into memory, a hard disk or the like of the responder (write operation). As shown in FIG. 16, the CBW indicating a communication request is transmitted from the USB host to the USB target before transmitting write data, which is data to be written (step S31). The CBW is composed of a parameter (PARAM) indicating the end point and the size of the CBW, and the data of the CBW. Each parameter shown in FIG. 16 is composed of an end point number indicating what kind of data it is before transmitting USB data and a total amount of data to be transmitted next. The end point number of 2 indicates data that is sent from the USB host to the USB target, and the end point number of 1 indicates data that is sent back from the USB target to the USB host.

When the USB target receives the CBW, it recognizes the size and the end point based on the parameter added to the CBW and performs mass storage class (MSC) processing on the data of the CBW (step S32). The USB target can thereby recognize that write data will be transmitted next based on the CBW and starts to wait for the data.

On the other hand, the USB host extracts the end point for the write data and the total size of the write data from the CBW data (step S33). Further, the USB host divides the write data into a plurality of pieces (step S34). Then, the USB host adds the end point and the total size extracted from the CBW to the plurality of pieces of write data and transmits it to the USB target (step S35). The CBW contains information (an end point, a size etc.) about the write data to be transmitted subsequently. Thus, by extracting only necessary information from the CBW and adding it to the write data, the need to convert all USB data according to the physical layer 108 of the JET device is eliminated, thereby minimizing the processing amount of the apparatus at the transmitting end. Further, the apparatus at the receiving end can obtain necessary information by referring to the parameter added to the write data without the need to analyze all the transmitted data, thus minimizing processing load.

After transmitting data, the USB host enters a wait state for a completion notification from the USB target. The USB target receives the write data, recognizes the added end point and total size, and performs MSC batch processing on the write data (step S36). The data on which the MSC batch processing has been performed is combined with the end point and the size and then written into a storage area of the upper level application or memory or the like.

After the writing in the USB target ends, the USB target transmits CSW, which is a completion notification, to the USB host. The CSW is composed of a parameter indicating the end point and the size of the CSW, and the data of the CSW. Upon reception of the CSW by the USB host in the completion notification wait state, data writing from the USB host to the USB target ends.

In the above-described processing, because the data amount of the CBW and the CSW is small, by transmitting the CBW, which is minimum necessary data, before transmitting the write data, the USB target at the receiving end can prepare SW precedently, thereby improving the performance of processing as a whole.

Further, when transmitting the write data from the USB host, the end point number and the data size of the write data is extracted from the CBW and added as a parameter for the write data to the header. The header is added only to the first data of URB that is divided at the time of data transmission, and the header is not added to the subsequent divided URB.

It is thereby possible to transmit a parameter at the time of data transmission/reception, which occupies a large part of transfer, in transaction of once in a plurality of times, thereby preventing degradation of performance due to conversion, significantly reducing an increase in transaction, and reducing overall system load.

Further, the USB target in which data is written can recognize into which location in a buffer the data should be written by referring to the end point that is added to the write data. The USB target exchanges necessary end point information with the USB host at the time of connection (which corresponds to USB enumeration). Then, the USB target prepares a necessary buffer area of the end point based on the information exchange and determines into which buffer the data is to be written based on the end point number of the data. There is thus no need to analyze all of the write data, and it is possible to pass the write data to the prescribed position of the upper level user application 100 and record it simply by referring to the parameter that is added to the header of the write data.

Figure 18:
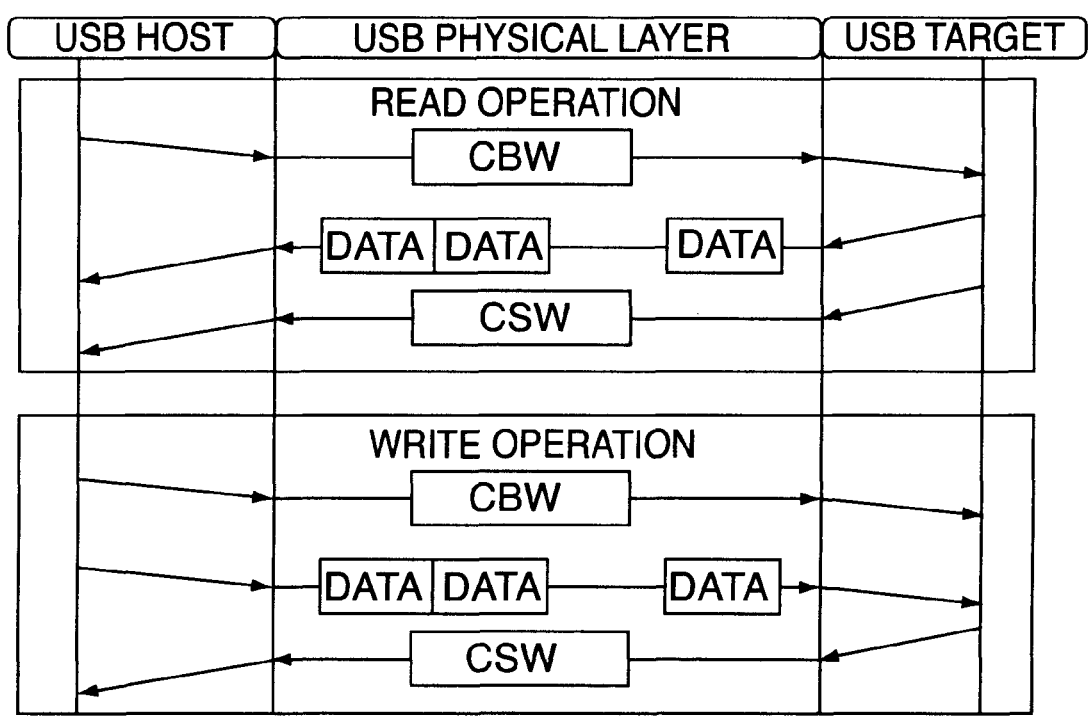
FIG. 18 is a schematic view showing the way that communication is performed between a USB host and a USB target through a USB physical layer.

Although FIG. 16 shows the write operation from the initiator to the responder, the read operation from the USB host to the USB target (cf. FIG. 18) can be processed in the same manner. In the case of the read operation, after CBW that requests reading of data is transmitted from the initiator to the responder, the responder extracts the parameter such as the end point number and the size from the CBW. Then, the responder divides the data to be transmitted to the initiator, adds one header containing the extracted parameter to the plurality of divided data pieces and transmits it to the initiator. Receiving the data, the initiator can transmit the received data to the prescribed position of the upper level application based on the parameter.

Figure 17A:
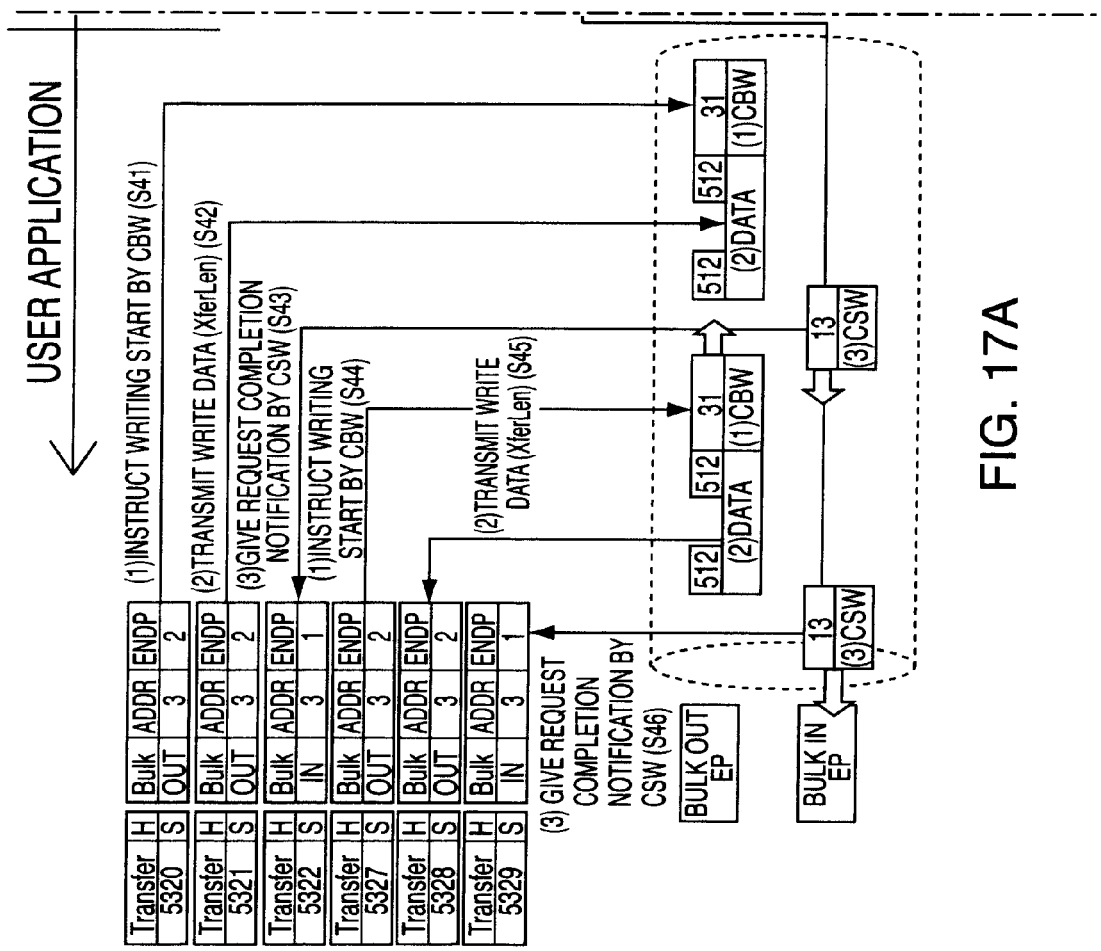
FIGS. 17A and 17B are schematic diagrams showing the processing of FIG. 16 in further detail.
Figure 17B:
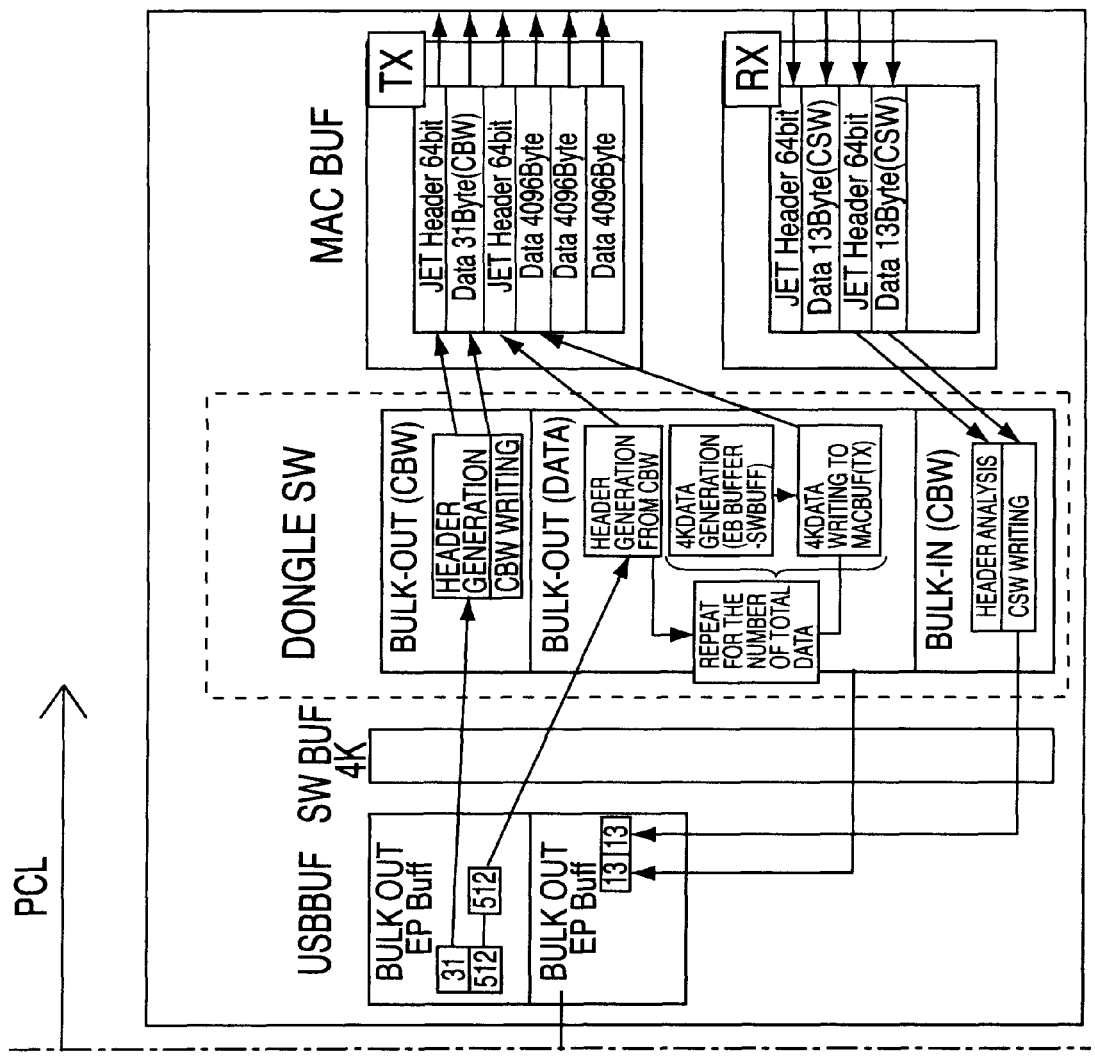

FIGS. 17A and 17B are schematic diagrams showing the processing of FIG. 16 in further detail, and showing the processing in the initiator. When start of writing is instructed by CBW from the USB host, which is the user application 100 of the initiator (step S41), the CBW is written to a USB buffer (USB BUF) once, and then generation of the header containing the parameter and writing of the CBW shown in FIG. 16 are performed in a dongle SW (DONGLE SW) of a lower level layer (the PCL 102). The CBW is then converted into JET header of 64 bits and data of 31 bytes (CBW) and written into a MAC buffer (MAC BUF). The header and the data written to the MAC buffer are transmitted (TX) to the USB target through the physical layer 108.

Then, when transmission of write data is instructed by the user application of the USB host (step S42), the data is written to the USB buffer (USB BUF) once, and the header is generated from the CBW in the lower level layer (the PCL 102). Further, the write data is divided into data pieces of 4 Kbytes each, and a plurality of 4-Kbyte data (data of 4096 bytes) and the header (JET header of 64 bits) are written into the MAC buffer (MAC BUF). In this way, the write data is divided into data pieces of 4 Kbytes each according to the physical layer 108 of the JET device. It is thereby possible to maximize the size of one data and reduce the load of the apparatus. The header and the data that are written to the MAC buffer are transmitted (TX) to the USB target through the physical layer 108. FIGS. 17A and 17B illustrate a case where an external device (DONGLE SW) is used as an example of a device that makes conversion between the USB physical layer and the physical layer 108 of the JET device, the PCL 102 is configured by an external device, and the user application in the upper level than the PCL 102 is configured by a device such as a personal computer. Alternatively, the initiator may be configured by a single device such as a personal computer without using the external device. The dongle SW corresponds to a device such as HUB and a card reader in USB.

The CSW that is received (RX) from the USB target is composed of the JET header of 64 bits and the data of 13 bytes (CBW) by the similar processing in the responder and held by the MAC buffer. The header of the data is analyzed by the dongle SW, and the data is written to the USB buffer. While the data size of the CBW is 31 bytes, the data size of the CSW is 13 bytes. Receiving the data of the USB buffer, the user application 100 gives a write request completion notification (step S43). The processing in the subsequent steps S44 to S46 is performed in the same manner as the steps S41 to S43.

As described in the foregoing, according to the embodiment, by bringing small pieces of header information together on a USB mass storage class protocol at the time of data transmission that occupies a large part of communication, it is possible to increase the transfer efficiency. Further, by extracting the minimum necessary parameter from the CBW, the apparatus that receives the data converted into a different physical layer 108 from the user application 100 can significantly reduce the load for parameter analysis. Although protocol conversion of the USB mass storage class is shown in the above-described example, the present invention is not limited thereto, and an increase in speed can be achieved in another protocol conversion as well by using the same technique. Further, although a wireless communication system is described by way of illustration in the example described above, the communication system may be a wired communication system.

It should be understood by those skilled in the art that various modifications, combinations, sub-combinations and alterations may occur depending on design requirements and other factors insofar as they are within the scope of the appended claims or the equivalents thereof.

What is claimed is:
1. A communication method, comprising:
in a first communication apparatus including a chip configured to implement a physical layer for data transmission or reception with a second communication apparatus and a central processing unit (CPU) configured to connect an upper level application and the physical layer:

selecting an upper level protocol of the first communication apparatus that matches an upper level protocol of the second communication apparatus;

extracting a parameter from a communication request transmitted from the upper level application of the first communication apparatus, wherein the extracted parameter includes an end point number indicating a direction of transfer of the data and a size of the data to be transferred, wherein a location of a storage area into which the data is to be written is determined based on the end point number;

dividing the data into a first data piece and a plurality of subsequent data pieces, each of the first data piece and the plurality of subsequent data pieces having a data amount;

adding a header containing the extracted parameter to only the first data piece; and transmitting the first data piece to which the header is added and the plurality of subsequent data pieces through the physical layer.

2. A first communication apparatus, comprising:

a chip configured to implement a physical layer for transmission or reception of data with a second communication apparatus; and a central processing unit (CPU) configured to:

connect an upper level application and the physical layer;

select an upper level protocol of the first communication apparatus that matches an upper level protocol of the second communication apparatus;

extract a parameter from a communication request transmitted from the upper level application of the first communication apparatus, wherein the extracted parameter includes an end point number that indicates a direction of transfer of the data and a size of the data to be transferred, wherein a location of a storage area into which the data is to be written is determined based on the end point number;

divide the data into a first data piece and a plurality of subsequent data pieces, wherein each of the first data piece and the plurality of subsequent data pieces have a data amount; and add a header that contains the extracted parameter to only the first data piece, and wherein the chip is further configured to transmit the first data piece to which the header is added, and the plurality of subsequent data pieces.

3. The first communication apparatus according to claim 2, wherein the CPU is further configured to acquire the parameter from data received from the second communication apparatus through the physical layer.

4. The first communication apparatus according to claim 2, wherein the CPU is further configured to write the data to the location of the storage area based on the parameter.

5. The first communication apparatus according to claim 2, wherein the upper level application is configured to select the upper level protocol compatible with the physical layer for the transfer of data based on a communication speed of the physical layer.

6. The first communication apparatus according to claim 2, wherein, in an event the first communication apparatus and the second communication apparatus are configured to use multiple same protocols, the CPU is further configured to select a protocol of the multiple same protocols for data transmission.

7. A communication system, comprising:

a first communication apparatus configured to communicate with a second communication apparatus, wherein the first communication apparatus comprises:

a chip configured to implement a physical layer for transmission or reception of data with the second communication apparatus; and a central processing unit (CPU) configured to:

connect an upper level application and the physical layer;

select an upper level protocol of the first communication apparatus that matches an upper level protocol of the second communication apparatus;

extract a parameter from a communication request transmitted from the upper level application of the first communication apparatus, wherein the extracted parameter includes an end point number that indicates a direction of transfer of the data and a size of the data to be transferred, wherein a location of a storage area into which the data is to be written is determined based on the end point number;

divide the data into a first data piece and a plurality of subsequent data pieces, wherein each of the first data piece and the plurality of subsequent data pieces have a data amount; and add a header that contains the extracted parameter to only the first data piece, wherein the first data piece to which the header is added and the plurality of subsequent data pieces are transmitted or received through the physical layer.

8. A non-transitory computer-readable medium having stored thereon a set of computer-executable instructions for causing a first communication apparatus to perform operations, comprising:

selecting an upper level protocol of the first communication apparatus that matches an upper level protocol of a second communication apparatus;

extracting a parameter from a communication request transmitted from an upper level application of the first communication apparatus, wherein the extracted parameter includes an end point number indicating a direction of transfer of the data and a size of the data to be transferred, wherein a location of a storage area into which the data is to be written is determined based on the end point number;

dividing the data into a first data piece and a plurality of subsequent data pieces, each of the first data piece and the plurality of subsequent data pieces having a data amount;

adding a header containing the extracted parameter to only the first data piece; and transmitting the first data piece to which the header is added and the plurality of subsequent data pieces through a physical layer.

* * * * *